United States Patent [19]
Fortenberry et al.

[11] Patent Number: 6,005,939
[45] Date of Patent: Dec. 21, 1999

[54] METHOD AND APPARATUS FOR STORING AN INTERNET USER'S IDENTITY AND ACCESS RIGHTS TO WORLD WIDE WEB RESOURCES

[75] Inventors: Keith Neil Fortenberry, Boca Raton, Fla.; Herman Rodriquez, Austin, Tex.

[73] Assignee: International Business Machines Corporation, Armonk, N.Y.

[21] Appl. No.: 08/761,256

[22] Filed: Dec. 6, 1996

[51] Int. Cl.$^6$ ....................................................... H04L 9/00
[52] U.S. Cl. ................................ 380/21; 380/23; 380/30; 380/43; 705/64; 705/67; 705/76; 713/155; 713/156; 713/167; 713/171; 713/182; 713/185; 713/200
[58] Field of Search ............................... 380/21, 3, 4, 49

[56] References Cited

U.S. PATENT DOCUMENTS

| | | | |
|---|---|---|---|
| 5,081,678 | 1/1992 | Kaufman et al. | 380/21 |
| 5,452,433 | 9/1995 | Nihart et al. | 395/500 |
| 5,455,953 | 10/1995 | Russell | 395/739 |
| 5,463,690 | 10/1995 | Crandall | 380/30 |
| 5,623,546 | 4/1997 | Hardy et al. | 380/4 |
| 5,671,279 | 9/1997 | Elgamal | 380/23 |
| 5,719,942 | 2/1998 | Aldred et al. | 380/49 |
| 5,724,423 | 3/1998 | Khello | 380/23 |
| 5,737,414 | 4/1998 | Walker et al. | 280/4 |
| 5,737,422 | 4/1998 | Billings | 380/25 |
| 5,784,463 | 7/1998 | Chen et al. | 380/21 |
| 5,835,595 | 11/1998 | Fraser et al. | 380/25 |
| 5,852,666 | 12/1998 | Miller et al. | 380/4 |

FOREIGN PATENT DOCUMENTS

| | | | |
|---|---|---|---|
| 0646857 | 9/1994 | European Pat. Off. | G06F 3/033 |

OTHER PUBLICATIONS

"IPv6: The New Internet Protocal," IEEE Communications Magazine, William Stallings, Jul. 1996, pp. 96–108.

Schneier's Applied Cryptography, 2nd Edition, Oct. 1995.

*Primary Examiner*—Tod R. Swann
*Assistant Examiner*—Paul E. Callahan
*Attorney, Agent, or Firm*—Kudirka & Jobse, LLP

[57] ABSTRACT

A method and apparatus for obtaining user information to conduct secure transactions on the Internet without having to re-enter the information multiple times is described. The method and apparatus can also provide a technique by which secured access to the data can be achieved over the Internet. A passport containing user defined information at various security levels is stored in a secure server apparatus, or passport agent, connected to computer network. A user process instructs the passport agent to release all or portions of the passport to a recipient node and forwards a key to the recipient node to unlock the passport information.

19 Claims, 6 Drawing Sheets

METHOD AND APPARATUS FOR STORING AN INTERNET USER'S IDENTITY AND ACCESS RIGHTS TO WORLD WIDE WEB RESOURCES

FIELD OF THE INVENTION

This invention relates generally to accessing public networks and, more particularly, to a method and apparatus for allowing access to an Internet web site.

BACKGROUND OF THE INVENTION

As is known in the art, there is a trend to conduct business over public computer networks. For example, a user may want to make a purchase or conduct a transaction over a public computer network such as the Internet. To do so, the user accesses the public network through a network node (e.g. a web site) and makes a purchase/transaction request with a particular vendor who is also coupled to the public network via a web site. In response to the user requests, a vendor may request user information such as user name, address, social security number, credit card number, etc.

To continue the transaction, the user responds to the vendor by entering the requested information (e.g. name, address, social security number, credit card number, etc. . . . ) at the web site and transmitting the information to the vendor. After receiving the information, the vendor then completes the transaction.

One problem with this approach, however, is that if a user wants to make additional transactions or requests, the user is often required to re-enter the same information for each request. This can lead to mistakes being made in entering the information. This is true even if the information only needs to be entered once in response to a single request. Furthermore, there may be problems maintaining particularly sensitive user information (e.g. credit card number, social security number, etc.) in secret.

For example, to access information on an Internet home page (e.g. the IBM home page on the Internet), a user must specify via a menu selection the language (e.g. English, French, German, etc. . . . ) in which the user would like to communicate. Such information must be re-entered each time the same user accesses the IBM home page.

It would therefore be desirable to provide a technique for allowing a user to specify particular information once and have the information be used each time the user accesses any site on the public network.

SUMMARY OF INVENTION

In accordance with the present invention, a passport system includes a single repository of user information in a single format and a passport access provider for accessing the user information in the repository and for providing a user passport to a requestor. With this particular arrangement a consistent, secure and redundancy free technique for obtaining and maintaining user information at one or several sites on a public network is provided. The public network may correspond, for example, to the Internet and the sites may correspond to web sites on the Internet. The consistency, security and redundancy problems are overcome by encapsulating and integrating the user information into the single repository, storing the information in a single format and providing access to that information using a standard interface.

In accordance with a further aspect of the present invention, a method for establishing a passport includes the steps of (a) receiving, in a passport agent, a request from a user to establish a passport, (b) opening a secure communication channel between the passport agent and the user, (c) presenting, via the passport agent, a series of menus to the user in response to which the user enters information and (d) storing the user information as a passport in a passport database. With this particular arrangement, a method for allowing a user to access a plurality of public network sites is provided. In one embodiment, the method further includes the step of securing the passport data. For example, such a method may include the steps of assigning an encryption key to the user and transmitting a public key to the user to allow the user to release a passport from the database. Any particular site which requires particular user information can obtain the user information from the user's passport without having to prompt the user for the parameter each time the web site is visited. To protect the user's privacy, the method may optionally include the steps of assigning a particular security level to each item of user information stored in the passport. By assigning a security level a user can protect sensitive information from being indiscriminately disclosed while the passport still can be used to grant access to more public information. For example, if currently visiting the IBM home page on the Internet, the user must specify a language in which to communicate. Such a user parameter may now be specified in a user passport which is provided to the home page server. Thus, a user need no longer specify such a parameter.

BRIEF DESCRIPTION OF THE DRAWINGS

The above and other features, objects and advantages of the invention will be better understood by referring to the following detailed description in conjunction with the accompanying drawing in which.

DESCRIPTION OF THE PREFERRED EMBODIMENTS

Figure 1:
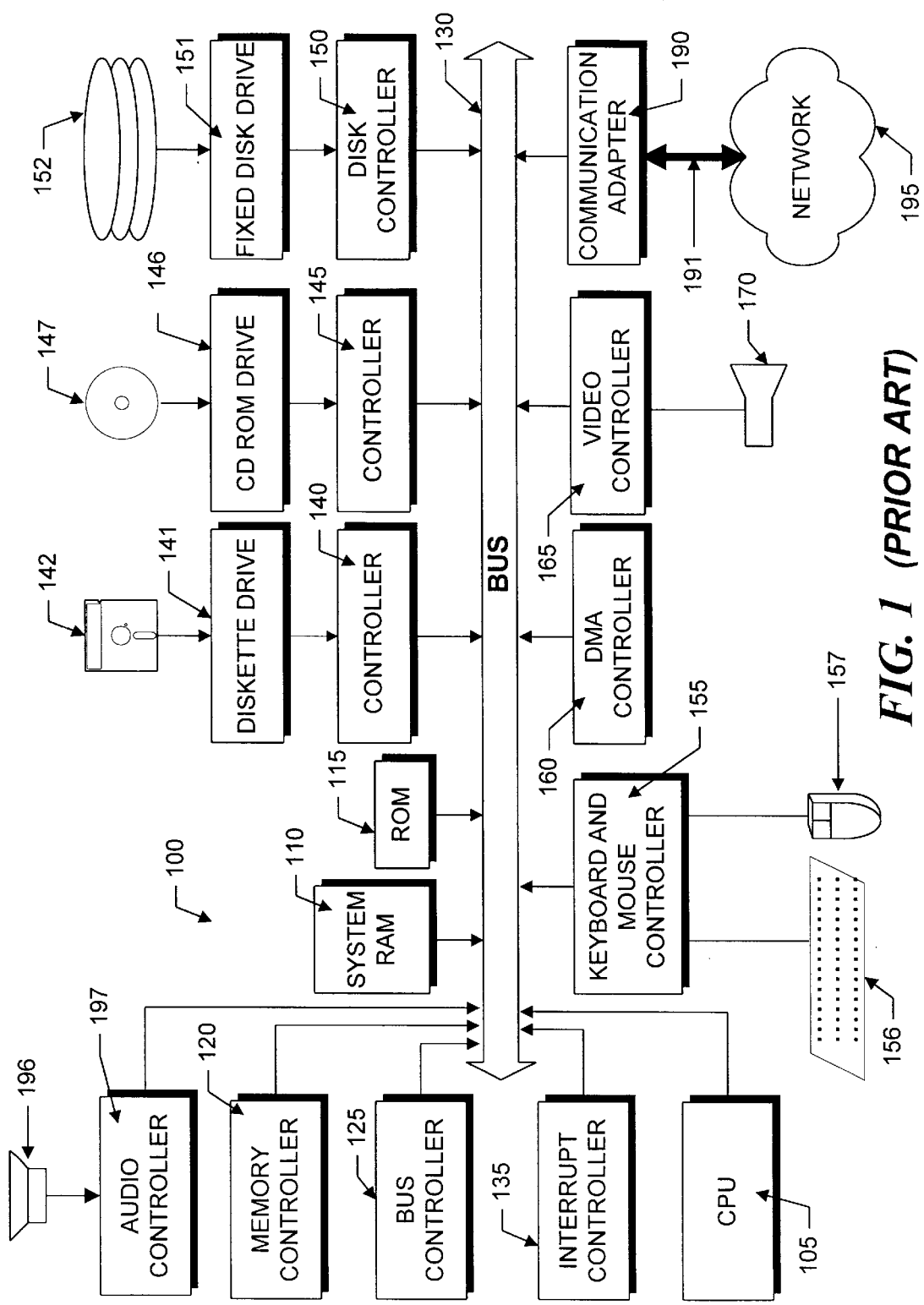
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things.

In one embodiment, the passport methods of the present invention are implemented in the C++ programming language using object-oriented programming techniques. C++ is a compiled language. That is, programs are written in a human-readable script and this script is then provided to another program called a compiler which generates a machine-readable numeric code that can be loaded into, and directly executed by, a computer.

As described below, the C++ language has certain characteristics which allow a software developer to easily use programs written by others while still providing a great deal of control over the reuse of programs to prevent their destruction or improper use. The C++ language is well known and many articles and texts are available which describe the language in detail. In addition, C++ compilers are commercially available from several vendors including Borland International, Inc. and Microsoft Corporation. Accordingly, for reasons of clarity, the details of the C++ language and the operations of the C++ compiler will not be discussed further in detail herein.

As will be understood by those skilled in the art, Object-Oriented Programming (OOP) techniques involve the definition, creation, use and destruction of "objects." Objects are software entities comprising data elements, or attributes, and methods, or functions, which manipulate the data elements. The attributes and related methods are treated as a single entity and can be created, used and deleted as if they were a single item. Together, the attributes and methods enable objects to model virtually any real-world entity in terms of its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which errors stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters, and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 2A:
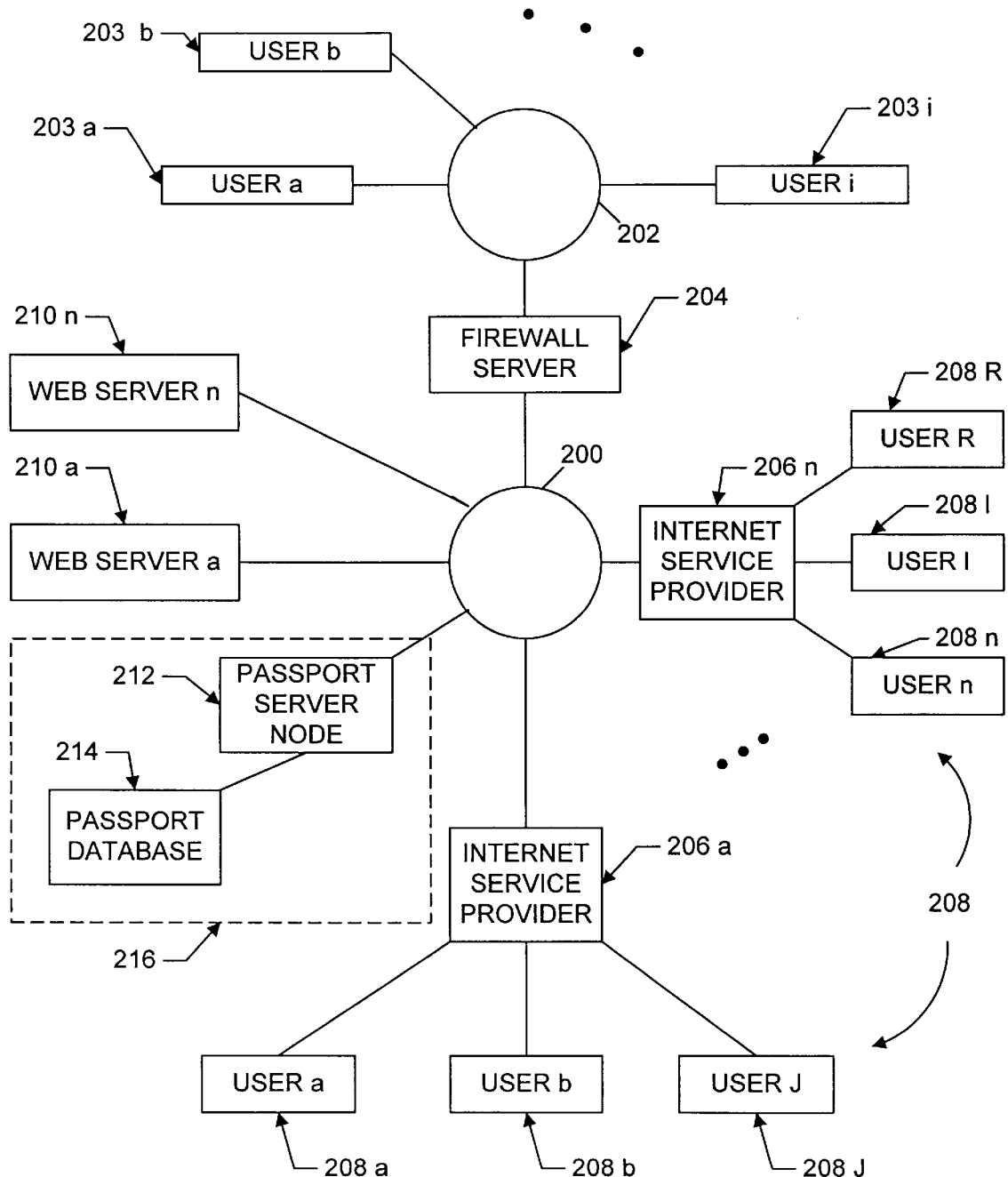
FIG. 2A is a schematic block diagram of a passport agent coupled to an Internet.

Referring now to FIG. 2A, a public network or internet 200 is coupled to a private network 202 through a fire wall server 204. As used herein, the term "internet" generally refers to any collection of distinct networks working together to appear as a single network to a user. The term "Internet", on the otherhand, refers to the so-called world wide "network of networks" that are connected to each other using the Internet protocol (IP) and other similar protocols. The Internet provides file transfer, remote log in, electronic mail, news and other services.

As described herein, the exemplary public network of FIG. 2A is for descriptive purposes only. Although the description may refer to terms commonly used in describing particular public networks such as the Internet, the description and concepts equally apply to other public and private computer networks, including systems having architectures dissimilar to that shown in FIG. 2A.

One of the unique aspects of the Internet system is that messages and data are transmitted through the use of data packets "data grams." In a data gram based network messages are sent from a source to a destination in a similar manner to a government mail system. For example, a source computer may send a data gram packet to a destination computer regardless of whether or not the destination computer is currently online and coupled to the network. The Internet protocol (IP) is completely sessionless, such that IP data gram packets are not associated with one another.

The fire wall server 204 is a computer which couples the computers of a private network e.g. network 202 to the Internet 200 and may thus act as a gatekeeper for messages and data grams going to and from the Internet 200. An Internet service provider 206 is also coupled to the Internet 200. A service provider is an organization that provides connections to a part of the Internet. Internet service provider 206 is also a computer which couples a plurality of users 208a–208N to the Internet 200. Thus, users 208 are coupled to the Internet through Internet service provider 206. Also coupled to the Internet in a plurality of web sites or nodes 210a–210n generally denoted 210. When a user wishes to conduct a transaction at one of the nodes 210, the user accesses the node 210 through the Internet 200.

Each node in the fire wall shown in FIG. 2A is configured to understand which fire wall and node to send data packets to given a destination IP address. This may be implemented by providing the fire walls and nodes with a map of all valid IP addresses disposed on its particular private network or another location on the Internet. The map may be in the form of prefix matched up to and including the full IP address.

Also coupled to Internet 200 is a passport server 212 and a passport data base 214. Passport server 212 and passport database 214 may be collectively referred to as a passport agent 216. Users 208 can store certain personal and optional demographic information in passport database 214. The information need only be stored once, and, at the user's option, assigned a security level for each item of information. The information may be stored, for example, as a record or as a file. Thus, passport agent 216 includes a database of user information for each of the users who wish to utilize the services of passport agent 216. The information for each particular user is stored in a particular data structure referred to as a passport.

Passport agent 216 may be provided, for example, as an object-oriented database management system (DBMS), a relational data base management system (e.g. DB2, SQL, etc.) or another conventional data base package which includes a security/authentication function. Thus, the database can be implemented using object-oriented technology or via text files which utilize a security system.

Figure 2B:
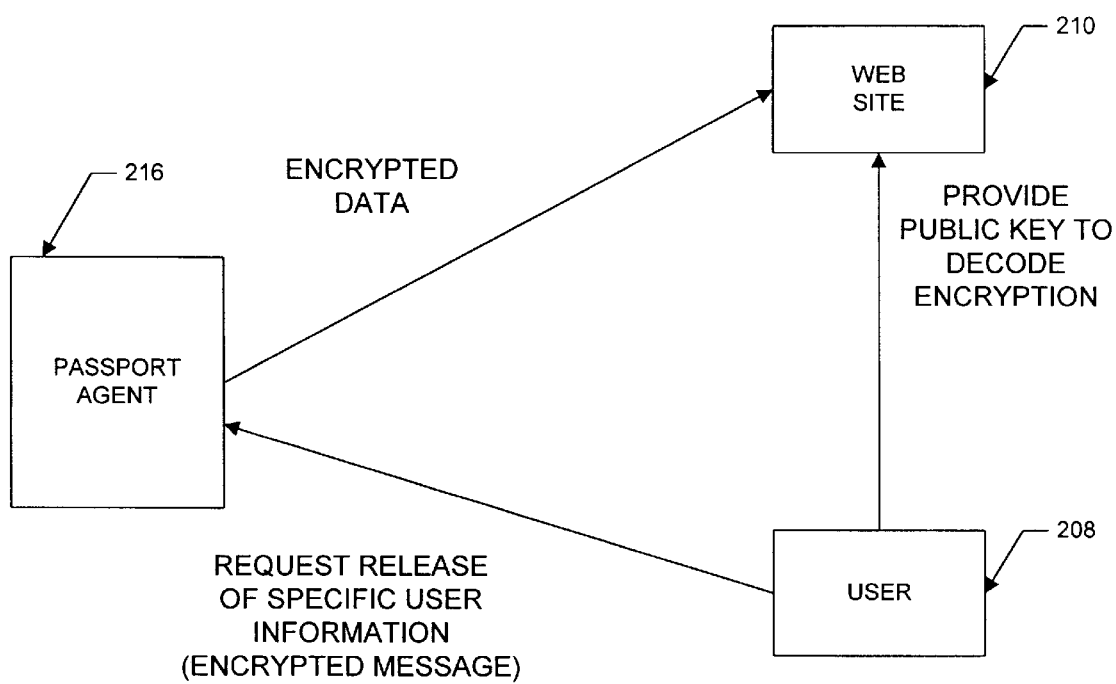
FIG. 2B is a conceptual schematic diagram of the interaction of a user system, passport agent server, and a vendor web site, in accordance with the present invention.

Referring now to FIG. 2B, in general overview, the passport system operates in the following manner. User 208 who wishes to conduct a transaction at web site 210 requests that passport agent 216 release specific user information to web site 210. The request is made as an encrypted message to passport agent 216. Passport agent 216 has previously been provided a key with which to decrypt the encrypted message from user 208. Passport agent 216 decrypts the request from user 208 to determine, inter alia, the particular web site to which a passport of the user 208 should be sent.

Passport agent 216 then provides encrypted data to the particular web site here denoted as web site 210. User 208 has previously provided to web site 210 a public key with which web site 210 can decode the encrypted data provided by passport agent 216.

The web site 210 receives the encrypted user information (i.e. the passport) from passport agent 216 and unlocks the message using the public key provided by the user 208. If the web site 210 is unable to unlock any of the environment variables in the passport, the request is ignored, as explained hereinafter.

It should be noted that user 208 can provide to web site 210 one of several public keys which allow web site 210 to unlock data having one of several security levels. For example, user 208 may have a first key which unlocks confidential user information in the user passport, a second key which unlocks secret user information in the user passport and a third key which unlocks top secret user information in the user passport. Thus, to unlock all the data in the passport, user 208 would have to provide to web site 210 all three keys.

Figure 3:
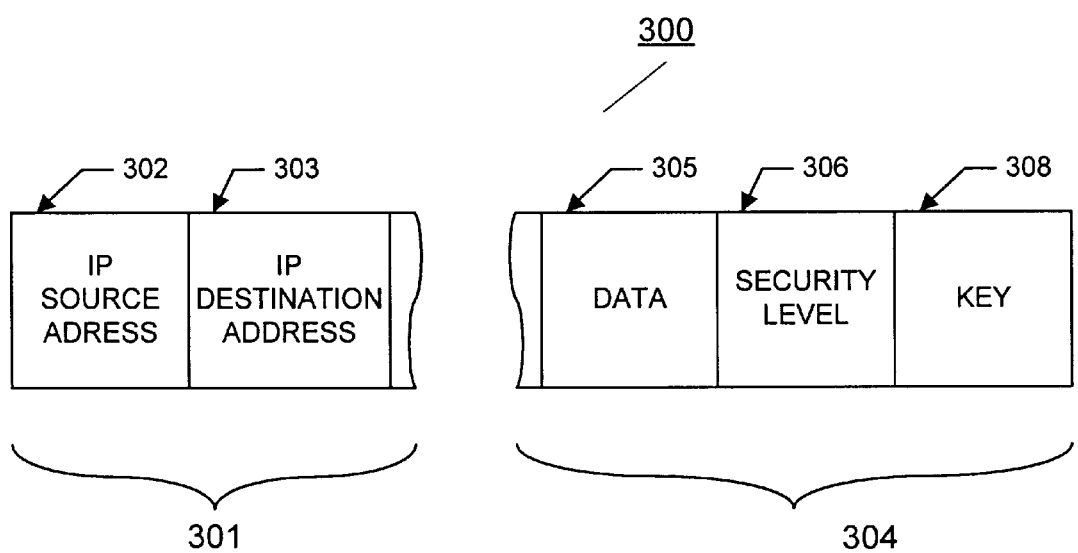
FIG. 3 is a diagrammatical representation of a passport packet.

Referring now to FIG. 3, a transmission packet 300 includes a header portion 301, having IP source address 302 and destination address 303, and a passport portion 304, having a data structure which includes fields 305, 306, and 308.

First data field 305 may contain two classes of data. The first class of information corresponds to real information about a user such as the user's real name, address, credit card information, social security number, etc. The real information is typically highly sensitive in nature and is closely guarded by the user. The first class of information is thus typically encrypted and is available only at the user's discretion. As mentioned above in conjunction with FIG. 2B, the user has a public key which the user can provide to others coupled to a network. The holder of the key can decrypt the user information.

The second class of information included in first data field 305 is virtual information. The virtual information is created and selected by the user. Virtual information includes items such as a virtual (i.e. not real) identification that can be used when visiting web sites and other Internet locations, browsing show rooms on the Internet, etc. This information may or may not be encrypted as per the user's wish. Virtual information may thus include information the user perceives not confidential in nature and may include users preferences, tastes, goals for visiting web sites, etc., yet the user may want to consider it private although not confidential. It should be noted that the term "visiting a web site" generally refers to a method of requesting a document from a web server.

At the user's option, virtual information can be converted to real information via a menu selection. In that event, the selected virtual information becomes restricted (e.g encrypted) and is no longer publicly available to others on the web.

For example, John Doe, a real user at the Internet, chooses to travel the Internet and be known by the name Jane Doe. Further, John Doe wants to present himself through a picture of a site list when visiting an Internet site or when communicating with other users on the Internet. John Doe's passport contains optional information that he is a classical musical buff. Thus, with the passport method, the user is allowed to present himself as the real person he is when required and as a virtual person on occasions where he wants to assume that virtual identity.

The passport 304 includes a second field corresponding to a security level field 306. A security level is assigned to each item of user information included in the passport data field 305. Thus, for example, if data in field 305 is assigned a security level of 0 then the data is clear. Alternatively, if the data is assigned a security level of 1 then the data is secured via a security technique such as an encryption technique. The passport 304 also includes a key field 308. One or more keys for encryption and decryption may be stored in key field 308.

Figure 4:
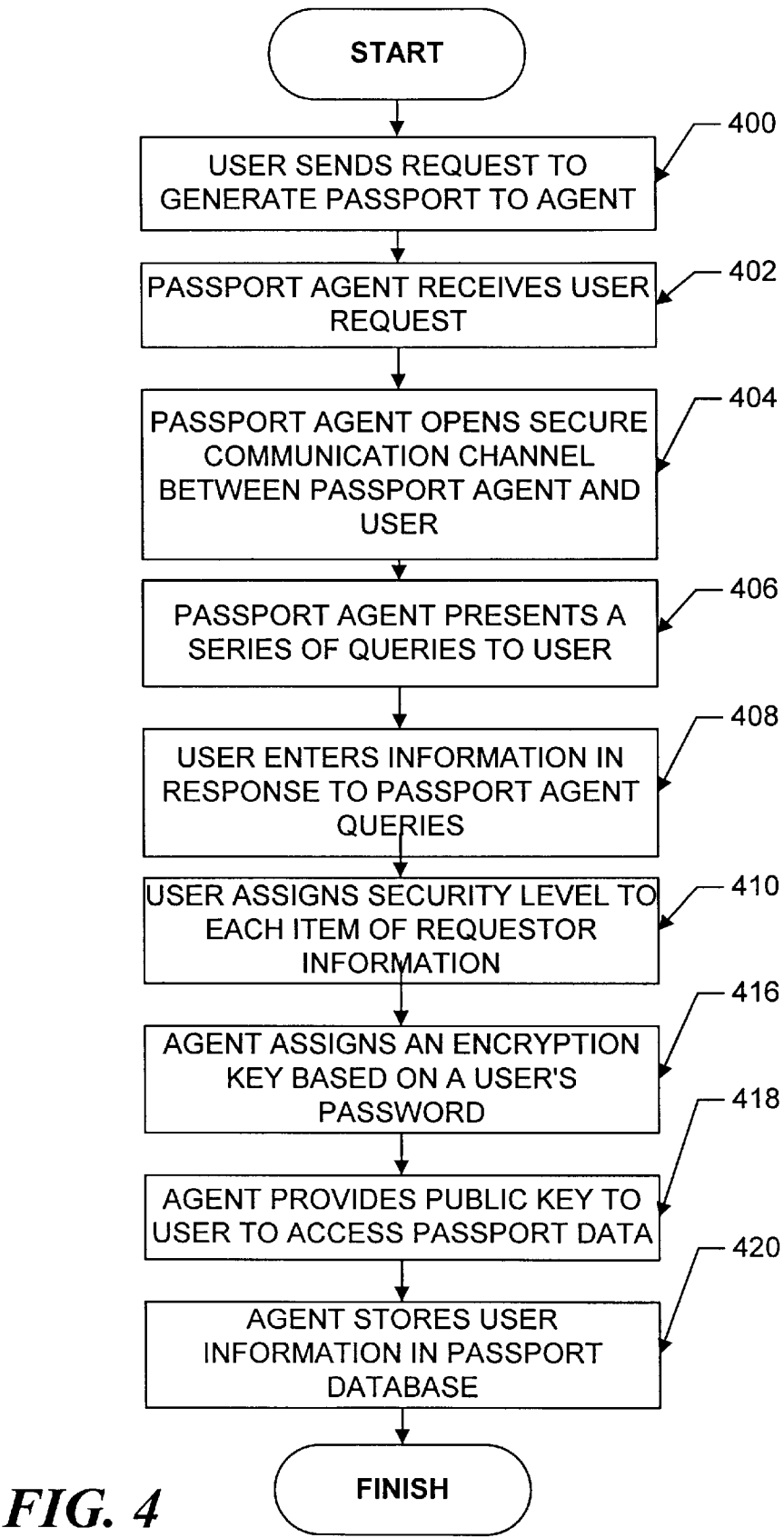
FIG. 4 is a flow diagram illustrating the steps to register information in a passport agent.

Referring to FIG. 4, a flow diagram illustrating the process steps to create a passport is shown. Coding of the process steps of the flowchart of FIG. 4 into instructions suitable to control the computer systems in the passport agent 216 and the user system 208 will be understood by those having ordinary skill in the art of programming. First, the user sends a request to generate a passport to passport agent 216, as illustrated by process step 400. The passport agent receives the request, as illustrated by process step 402, and opens a secure communication channel between the passport agent and the requesting user, as illustrated by process 404. Passport agent 216 then presents to the user a series of queries which may be in the form of menus, as illustrated by process block 406. In response, the user enters the requested information such as social security number, drivers license number, etc., and a corresponding level of security to protect the information item, as illustrated by process blocks 408 and 410. The user specified information is referred to herein as user information or environmental variables. The security levels assigned to each item of user information or environment variables range from highly secure to public. For example, particularly sensitive information may be designated as highly secured and assigned a high security level of 100 on an exemplary scale of 0–100 levels. Less sensitive information may be designated as less secured or even public and assigned a lower security level approaching or equal to zero. Next, passport agent 216 provides a public key to the user to access the passport data, as illustrated by process 418. Finally, the user's information which collectively comprises the Internet passport is stored and maintained in a highly secured server site on the Internet which serves as the passport agent and guarantees the integrity of the users passport, as illustrated by process block 420.

Security keys are delivered to the passport requestor also in a secure manner. As mentioned above, several security keys may be given to a user, such that access to information may be granted at various levels such as real-ID (very secure), virtual-ID and less private information classes. In this manner, the passport agent protects the passport information provided by the user.

When the passport agent sends passport information to the web server on behalf of the passport holder, the private key is used to encrypt the specific information authorized by the passport holder. When the vendor's server receives passport data from the passport agent, one of the public keys sent by the user is used to unlock the passport data. If the public key does not unlock the passport data, the vendor's server simply ignores the users request.

A security level is also used to assign an encryption key based on a user's password. The encryption method uses the concept of public and private keys so that the public key is given the user to access passport data and the passport agent presents the encrypted user data based on the private key. No one but the passport agent on the Internet has access to the private key. The passport owner has a copy of the public key.

Figure 5:
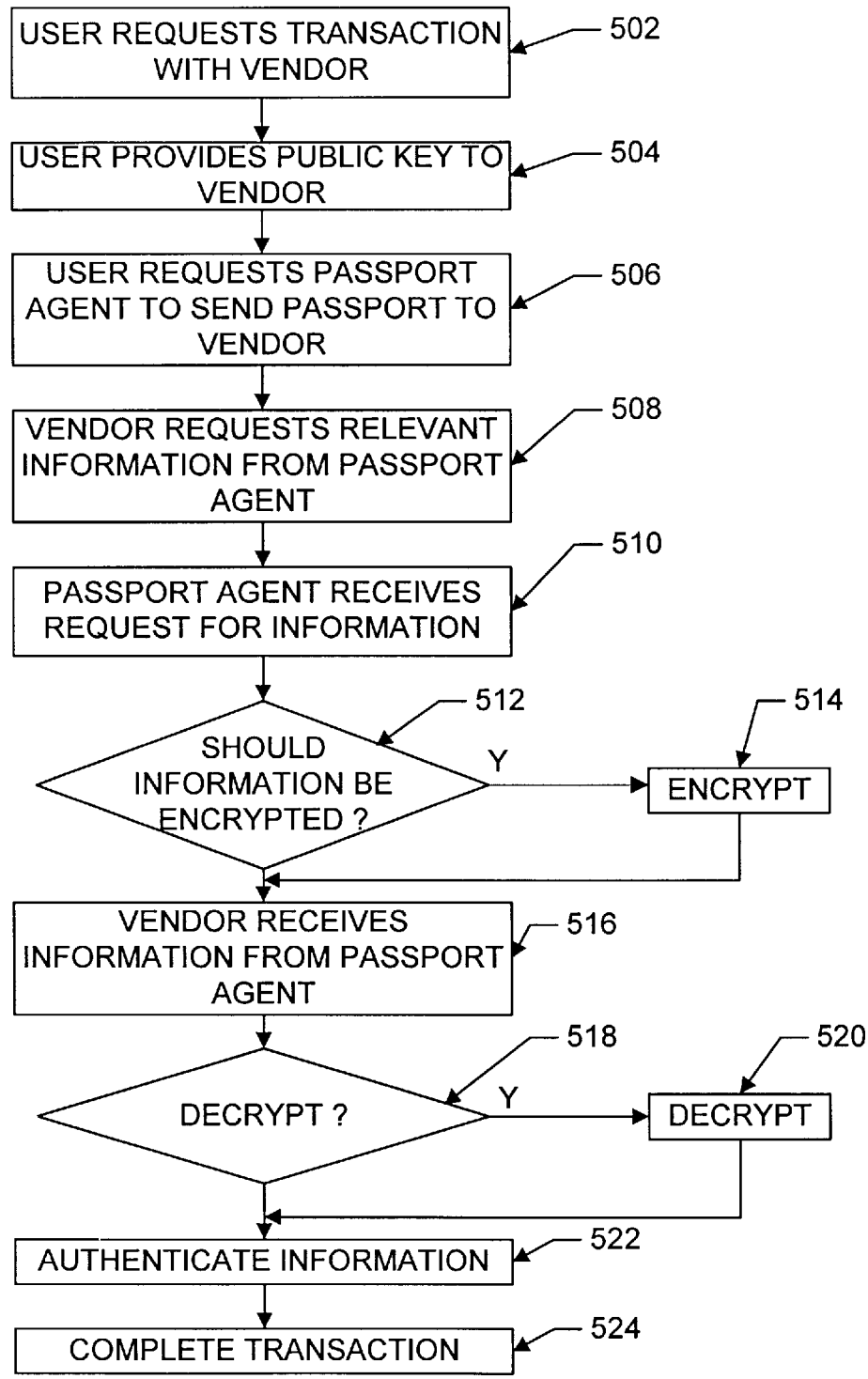
FIG. 5 is a flow diagram illustrating the steps in completing a transaction between a user and a vendor over an Internet using a passport.

Referring now to FIG. 5, a flowchart illustrating the process steps for providing access to a users internet passport via passport agent is illustrated. The coding of the process steps of the flowchart of FIG. 5 into instructions suitable to control passport agent 216, web site 210 and user 208 will be understood by those ordinary skill in the art of programming. First, the user requests a transaction with a particular vendor, i.e., web site 210, as illustrated by process block 502. Next, the user provides a public key to the vendor, as illustrated in process block 504. The public key was previously provided to the user by passport agent 216. Next, the user requests that passport agent 216 send the user's passport to the vendor, as illustrated by process block 506. This message is encrypted with a security key obtained by the user via a secured method. The vendor requests relevant information contained in the user environment variables from the passport agent, as illustrated by process block 508. The request for information is specified in the message as follows: RELEASE-TYPE TO INTERNET-SITE ON BEHALF OF MY-USER-ID. For example, when requesting the passport agent to release social security number information, the message looks like: RELEASE SOCIAL-SECURITY-NUMBER TO WEB-SITE-X ON BEHALF OF MY-USER-ID. Passport agent 216 receives the request for the information, as illustrated by process block 510 and, based on the security level of the identified information, determines whether or not the requested information should be transmitted to the vendor in encrypted form, as illustrated by decisional block 512. If the information is to be encrypted, an encryption process is carried out by passport agent 216, as illustrated by process block 514.

If the data is encrypted, the private key is used to encrypt the contents of the user environment variables. The encrypted data contains the name of the user environment variable and its assigned value. Otherwise, the requested information is sent to the vendor by passport agent 216, as illustrated by process block 516. When the vendor, i.e. the web server receives passport data from the passport agent 216, and such user information is encrypted, the public key sent by the user is used to unlock and decrypt the passport data, as illustrated by the decisional block 518 and process block 520. If the public security key does not unlock the passport data, the vendor simply ignores the users request. Next, the users information is authenticated by the vendor, e.g. verified with an on-line financial database etc., in a manner understood by those reasonably skilled in the arts, as illustrated by process block 522. Finally, once the information has been authenticated the vendor is able to complete the transaction, as illustrated by process block 524.

In the exemplary embodiment, both the passport agent and the web site of the vendor subscribe to the protocol which enable them to participate in the passport system contemplated herein. Further, the public and private keys described herein may be encrypted using a double keying encryption technology technique currently known in the art.

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used.

For example, it should be noted that in the particular embodiment described above in conjunction with FIG. 2A, passport security is provided via a public key- private key encryption technique. In other embodiments, however, passport security may be provided from other techniques. For example, the system may be made secure by using a so-called SSL system in which, a server is certified with the SSL system and a client browser (e.g. a Netscape browser) establishes a connection with the certified server. Security in the connection is established via methods provided a security system provider such as VeriSign, for example. Thus, in this particular technique, the client browser is provided having the appropriate authentification codes and the browser determines whether it is receiving appropriate verification/authentication signals. Such security may be provided, for example, on a per session basis, on connections established between a client and the certified server. It should also be recognized that other encryption techniques such as the Date Encryption Standard (DES) and the Pretty Good Privacy (PGP) system can also be used.

It is felt therefore that these embodiments should not be limited to disclosed embodiments, but rather should be limited only by the spirit and scope of the appended claims.

What is claimed is:

1. A method of sending data from a first node to a second node utilizing a passport server node having a plurality of passports stored therein, a network comprising and interconnecting the first, second and passport server nodes, each of the plurality of passports having a data portion, a security level, and a key, the method comprising the steps of:

maintaining a passport database for storing profile data for each of a plurality of users in a data structure comprising the passport for the corresponding user, the first node corresponding to a first of the users and to a first of the passports:

transmitting a first request from the first node to the second node for a transaction with the second node;

transmitting a public key from the first node to the second node, the public key having been previously provided by the passport server node to the first node;

transmitting an encrypted message from the first node to the passport server node wherein the encrypted message directs the passport server node to transmit the first passport stored in the passport server node to the second node;

transmitting the first passport from the passport server node to the second node; and if the data portion of the transmitted first passport is encrypted, the second node decodings via the public key transmitted from the first node to the second node, the data portion of the the first passport so as to use the data portion for the transaction with the first node.

2. The method of claim 1 further comprising the steps of:

receiving the encrypted message in the passport server node; and decrypting the encrypted message in the passport server node.

3. The method of claim 2

A) wherein each of the data portions of the passports includes one or more data items comprising profile data, and each of the passports has a security level associated with each of the data items;

B) wherein the message decrypting step includes the step of: extracting a request for a first data item comprising the requested data item from the encrypted message; and C) wherein the determining step includes the step of: responsive to the decrypted message, and based at least in part on the security level of requested data item, the passport server node determining whether the requested data item of the data portion of the first passport should be transmitted to the second node in encrypted form, and, if so, encrypting the data portion.

4. A computer server apparatus for use with a computer network, the computer server apparatus for transmitting information between two nodes coupled to the computer network, the server apparatus comprising:

means disposed at a user profile node for registering a plurality of user profile information, the user profile information containing multiple data items wherein at least some of the information is encrypted; the user profile information including a security level for accessing each of the data items;

means for storing the user profile information in data structures comprising a plurality of passports each including a plurality of the data items corresponding to a user;

means disposed at the user profile node for receiving an encrypted message from a user, the encrypted message including a request for transmission of data items in a specified one of the passports to a specified address of a destination node on the computer network;

means disposed at the user profile node for decrypting the encrypted message provided by the user; and means responsive to the request for transmitting said requested data items to the destination node.

5. A system for sending data over a public network, the system comprising:

means for transmitting a first request from a first node to a second node over the public network for a transaction with the second node;

means for transmitting a public key from the first node to the second node over the public network;

a passport server node, coupled to the computer network, said passport server node having a memory for storing a plurality of passports, each of the passports corresponding to one of a like plurality of users and each of the plurality of passports having a data portion, a security level portion, and a key portion, the data portion of each of the passports having profile data for one of the users the passport server node comprising:

means for receiving an encrypted message transmitted from the first node to the passport server node wherein the encrypted message directs the passport server node to transmit a particular one of the plurality of passports stored in the passport server node to the second node;

means for decrypting the encrypted message in the passport server node and extracting therefrom information identifying the particular passport;

responsive to the message, and based at least in part on the security level of the particular passport, the passport server node determining whether the data portion of the particular passport should be transmitted to the second node in encrypted form, and, if so, encrypting the data portion;

means for transmitting the particular one of the plurality of passports from the passport server node to the second node; and means in the second node for decoding via the public key transmitted from the first node to the second node, the data portion of the particular one of the plurality of passports if the data portion is encrypted.

6. A method for establishing a user passport for use by the user in connection with transactions over a network with third-party sites, comprising the steps of:

(a) a user sending a request to generate a passport to a passport agent;

(b) receiving the request in the passport agent;

(c) opening, via the passport agent, a secure communication channel between the passport agent and the user;

(d) presenting, via the passport agent, series of queries to the user;

(e) the user entering user profile information, including a plurality of data items regarding the user, in response to the passport agent queries;

(f) the user assigning a security level to each item of user profile information;

(g) the passport agent assigning an encryption key to the user based at least in part on the security level assigned each item of user profile information by the user;

(h) the passport agent transmitting at least one public key, which corresponds to the assigned encryption key, for enabling the user to share the public key with one or more of the third-party sites and thereby enabling the one or more third-party sites to access passport profile information; and (i) storing the user profile information in a passport database for subsequent transmission and use, responsive to a user request, in connection with transactions with the third-party sites.

7. The method of claim 6 wherein the step (g) comprises:

(g.1) assigning an encryption key based on a password assigned to the user.

8. The method of claim 6 wherein the step (h) comprises:

(h.1) transmitting the public key to the user over the secure communication channel between the passport agent and the user.

9. A system for establishing a user passport comprising:

a passport database for storing a plurality of user passports, each comprising a data structure containing user information with respect to a different one of a plurality of users;

means for receiving a request to generate a passport from a user;

means for establishing a secure communication channel to the user;

means for presenting a query to the user;

means for receiving user information entered in response to the query;

means for assigning a security level to each item of user information received by said means for receiving;

means for assigning an encryption key to the user;

means for storing the user information in one of the passports in said passport database corresponding to the user; and means for transmitting a public key to the user, which corresponds to the assigned encryption key, for enabling the user to share the public key with one or more third parties and thereby enable the one or more third parties to access the user information stored in the corresponding passport in said passport database.

10. The system of claim 9 wherein the means for assigning an encryption key includes means for assigning an encryption key based on a password assigned to the user.

11. The system of claim 9 wherein the means for transmitting the public key to the user includes means for transmitting the public key to the user over the secure communication channel.

12. The method of claim 3, wherein the message encrypting step includes the step of encrypting the requested data item using a private key.

13. The method of claim 3, wherein the step of the transmitting a public key from the first node to the second node includes the steps of ascertaining, based at least in part on the security level of requested data item, which of a plurality of public keys to send to the second node, each of a plurality of the data items having a corresponding key associated with the security level of the data item.

14. The method of claim 1 further comprising the step of authenticating the decoded data portion.

15. The method of claim 4, wherein, responsive to the encrypted message, and based at least in part on the security level of the first passport, the passport server node determining whether the data portion of the first passport should be transmitted to the second node in encrypted form, and, if so, encrypting the data portion.

16. The computer system of claim 4 further comprising means responsive to the requests for transmitting to the destination node the one passport and a public key corresponding to the security level of the requested data items.

17. A computer program product comprising a computer-readable media, and computer-executable program code stored on the computer-readable media, wherein the program code is suitable for use in a system for sending data from a first node to a second node utilizing a passport server node having a plurality of passports stored therein, each of the plurality of passports having a data portion, a security level, and a key, the program code comprising:

program code for accessing a passport database stored on a passport server node, the passport database storing profile data for each of a plurality of users in a data structure comprising the passport for the corresponding user, the first node corresponding to a first of the users and to a first of the passports;

program code for transmitting a first request from the first node to the second node for a transaction with the second node;

program code for transmitting a public key from the first node to the second node, the public key having been previously provided by the passport server node to the first node; and program code for transmitting an encrypted message from the first node to the passport server node wherein the encrypted message directs the passport server node to transmit the first passport stored in the passport server node.

18. A computer program product comprising a computer-readable media, and computer-executable program code stored on the computer-readable media, the program code capable of establishing a user passport for use by a user in connection with transactions over a network with third-party sites, the program code comprising:

(a) program code for receiving a request from a user to generate a passport;

(b) program code for presenting a series of queries to the user, and for receiving user profile information from the user, including a plurality of data items regarding the user, in response to the queries;

(c) program code for receiving from the user a security level assigned to each item of user profile information;

(d) program code for assigning an encryption key to the user based at least in part on the security level assigned each item of user profile information by the user;

(e) program code for transmitting at least one public key, which corresponds to the assigned encryption key, for enabling one or more third-party sites to access the passport profile information; and (f) program code for storing the user profile information in a passport database for subsequent transmission and use, responsive to a user request, in connection with transactions with the third-party sites.

19. A computer data signal embodied in a carrier wave, the computer data signal capable of use in establishing a user passport for use by a user in connection with transactions over a network with third-party sites, the computer data signal comprising:

(a) program code portion for receiving a request from a user to generate a passport;

(b) program code portion for presenting a series of queries to the user, and for receiving user profile information from the user, including a plurality of data items regarding the user, in response to the queries;

(c) program code portion for receiving from the user a security level assigned to each item of user profile information;

(d) program code portion for assigning an encryption key to the user based at least in part on the security level assigned each item of user profile information by the user;

(e) program code portion for transmitting at least one public key, which corresponds to the assigned encryption key, for enabling one or more third-party sites to access the passport profile information; and (f) program code portion for storing the user profile information in a passport database for subsequent transmission and use, responsive to a user request, in connection with transactions with the third-party sites.

* * * * *